(12) United States Patent
Contreras et al.

(10) Patent No.: US 9,165,596 B1
(45) Date of Patent: Oct. 20, 2015

(54) MAGNETIC RECORDING DISK DRIVE WITH MULTIPLE PREAMPLIFIERS AND COMMON TRANSMISSION LINE WITH IMPEDANCE COMPENSATION

(71) Applicant: HGST Netherlands B.V., Amsterdam (NL)

(72) Inventors: John Contreras, Palo Alto, CA (US); Nobumasa Nishiyama, Yokohama (JP); Joey Martin Poss, Rochester, MN (US); Tuyen Van Trinh, Mission Viejo, CA (US); Craig K. Yanagisawa, Palo Alto, CA (US); Yasunori Kubo, Fujisawa (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/656,898

(22) Filed: Mar. 13, 2015

(51) Int. Cl.
*G11B 5/09* (2006.01)
*G11B 5/02* (2006.01)
*G11B 20/10* (2006.01)

(52) U.S. Cl.
CPC .................................. *G11B 20/10009* (2013.01)

(58) Field of Classification Search
CPC .... G11B 20/10009; G11B 5/09; G11B 5/012; G11B 2220/90; G11B 25/043; G11B 5/4826; G11B 5/6005

USPC ........ 360/32, 39, 46, 67, 99.23, 99.24, 234.5, 360/234.6
See application file for complete search history.

(56) References Cited

U.S. PATENT DOCUMENTS

| | | | |
|---|---|---|---|
| 5,986,841 A | 11/1999 | Sorenson | |
| 6,118,602 A | 9/2000 | de la Soujeole | |
| 6,304,403 B1 | 10/2001 | Ionescu | |
| 6,317,862 B1 | 11/2001 | Dolan, Jr. et al. | |
| 6,333,828 B1 | 12/2001 | Morita et al. | |
| 6,400,520 B1 | 6/2002 | Stoutenburgh et al. | |
| 6,449,115 B1 | 9/2002 | Maki | |
| 7,082,004 B2 * | 7/2006 | Kajiyama et al. | 360/46 |

* cited by examiner

*Primary Examiner* — Nabil Hindi
(74) *Attorney, Agent, or Firm* — Thomas R. Berthold

(57) ABSTRACT

A disk drive has multiple preamplifiers (preamps) connected to the system-on-a-chip (SOC) by a common transmission line with resistors between the preamps and the SOC. Each preamp includes a read resistor at the output of each read amplifier, and a write resistor at the input of each write driver. The resistors may be programmable resistors located in the preamps. The read resistors are at the source of the signal to the transmission line and the write resistors are at the termination of the signal from the transmission line. The read and write resistors provide impendence matching with the transmission line and the SOC when one of the preamps is selected as active, which enables the SOC to operate seamlessly with a common transmission line connected to all preamps.

19 Claims, 10 Drawing Sheets

MAGNETIC RECORDING DISK DRIVE WITH MULTIPLE PREAMPLIFIERS AND COMMON TRANSMISSION LINE WITH IMPEDANCE COMPENSATION

BACKGROUND OF THE INVENTION

1. Field of the Invention

The invention relates generally to magnetic recording hard disk drives (HDDs), and more particularly to an HDD that has multiple read amplifier/write driver integrated circuits connected to the system-on-a-chip (SOC) by a common transmission line.

2. Description of the Related Art

HDDs typically include a main integrated circuit, which is typically a system-on-a-chip (SOC) that contains many of the electronics and firmware for the HDD. The SOC is connected by a transmission line on a flex cable to the HDD's read amplifier/write driver integrated circuit (preamp IC). The preamp IC is typically located on the actuator that moves the read/write heads to the selected data tracks on the disks. The data to be written by the write head is sent from the SOC to the preamp IC, where the write driver generates analog write current pulses that are applied to the inductive coil in the write head to write data by selectively magnetizing the magnetic media of the recording layer on the disk. The data read back from the disk by the read head is transmitted from the preamp IC to the SOC.

The preamp IC includes multiple ports for controlling multiple heads, with each head accessing an associated disk surface. However, the demand for higher storage capacity per HDD requires an increase in the number of disks and heads, and thus an increase in the number of preamp IC ports to support those heads. Preamp ICs with high numbers of ports are available but at a significant cost increase. Therefore, utilizing multiple preamp ICs with a smaller number of ports would be advantageous from a cost perspective. The challenge is creating a disk drive with multiple preamp ICs connected to the SOC by a common transmission line and common digital logic control lines, and that operates seamlessly like a disk drive with a single preamp IC.

SUMMARY OF THE INVENTION

Embodiments of this invention relate to a disk drive with multiple preamp ICs connected to the SOC by a common transmission line with resistors between the preamp ICs and the SOC that provide impedance matching. Each preamp IC includes a read resistor at the output of each read amplifier, and a write resistor at the input of each write driver. The resistors may have a fixed value and be located in the preamps or on the flex cable for the transmission line. If the resistors are located in the preamps then they may be programmable resistors that can be set to selected values at the time of disk drive manufacturing. The read resistors are at the source of the signal to the transmission line and the write resistors are at the termination of the signal from the transmission line. The read and write resistors provide impedance matching with the transmission line and the SOC when one of the preamp ICs is selected as active, which enables the SOC to operate seamlessly with a common transmission line connected to all preamp ICs.

In one embodiment there are three preamp ICs connected to the termination of the transmission line using a T configuration, where the lengths of the connections between the preamp ICs and the transmission line termination are substantially equal and have substantially the same characteristic impedance. The characteristic impedances of the connection lines can be made greater than the characteristic impedance of the transmission line from the SOC to the termination end. This will add a high-frequency boost that will be beneficial to the system response.

For a fuller understanding of the nature and advantages of the present invention, reference should be made to the following detailed description taken together with the accompanying figures.

DETAILED DESCRIPTION OF THE INVENTION

Figure 1:
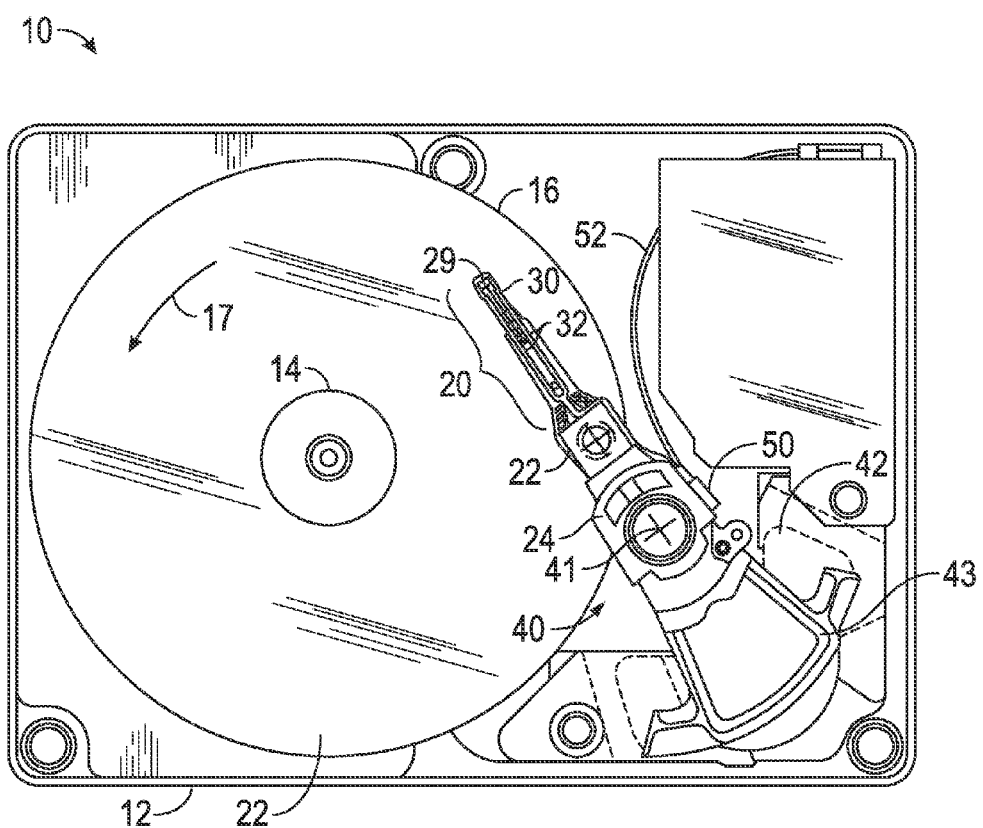
FIG. 1 is a top plan view of a head/disk assembly (HDA) of a magnetic recording hard disk drive.

FIG. 1 is a top plan view of a head/disk assembly (HDA) of a hard disk drive 10 that may include embodiments of the invention. The disk drive 10 includes a rigid base 12 supporting a spindle 14 that supports a stack of disks, including top disk 16. The spindle 14 is rotated by a spindle motor (not shown) for rotating the disks in the direction shown by curved arrow 17. Disk drive 10 also includes a rotary actuator assembly 40 rotationally mounted to the base 12 at a pivot point 41. The actuator assembly 40 is a voice coil motor (VCM) actuator that includes a magnet assembly 42 fixed to base 12 and a voice coil 43. When energized by control circuitry (not shown) the voice coil 43 moves and thereby rotates E-block 24 with attached arms 22 and load beam assemblies 20 to position the heads 29 to the data tracks on the disks. Each load beam assembly 20 has an integrated lead suspension (ILS) 30 with an array of electrically conductive lines or traces 32 that connect to a read/write head 29. The traces 32 connect at one end to the read/write head 29 and at the other end through a short flex cable to a read amplifier/write driver integrated circuit (preamp IC) 50 secured to a side of the E-block 24. The preamp IC 50 receives write data input signals from the disk drive's system-on-a-chip (SOC) (not shown) that is typically located on the back side of base 12. The SOC is connected to preamp IC 50 by a flex cable 52 and through its electronic packaging, printed circuit board, and flex connector (not shown).

While only one disk surface and associated head is depicted in FIG. 1, there are typically multiple disks and associated heads/load beam assemblies. The preamp IC includes multiple ports for controlling multiple heads. However, the demand for higher storage capacity per HDD requires an increase in the number of disks and heads, and thus an increase in the number of preamp IC ports to support those heads. Preamp ICs with high numbers of ports, up to 14, are available but at a significant cost increase. Therefore, utilizing multiple preamp ICs with a smaller number of ports would be advantageous from a cost perspective. The challenge is creating a disk drive with multiple preamp ICs connected to the SOC by a common transmission line and common digital logic control lines, and that operates seamlessly like a disk drive with a single preamp IC.

Figure 2:
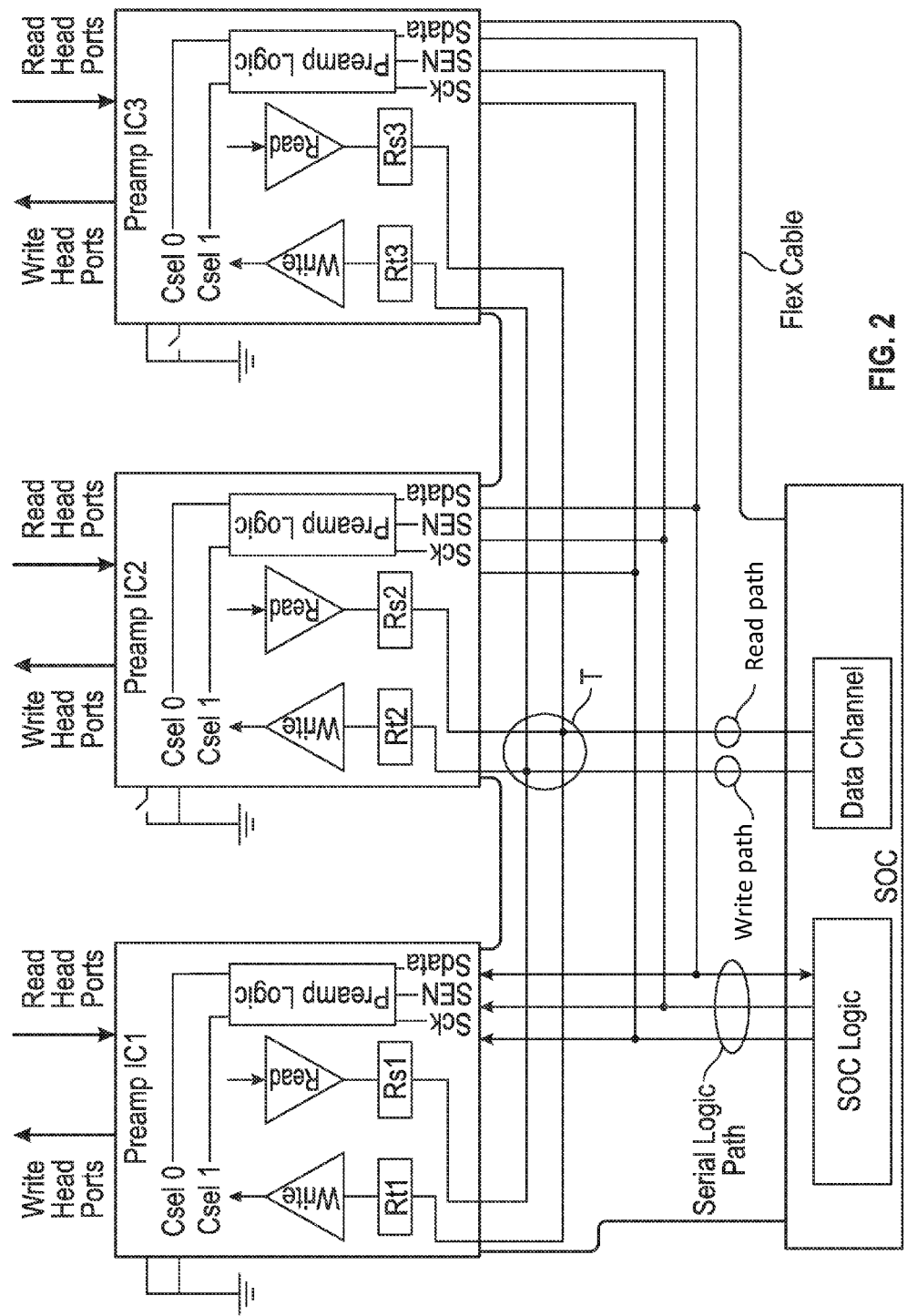
FIG. 2 is a schematic of the system-on-a-chip (SOC) and multiple preamplifier integrated circuits (ICs) connected by a common transmission line according to an embodiment of the invention.

FIG. 2 is a schematic of the SOC and multiple preamp ICs connected by a common transmission line according to an embodiment of the invention. Three preamp ICs (IC1, IC2 and IC3) are depicted, each with multiple write head ports and read head ports, but the invention is applicable to a disk drive with at least two preamp ICs. The SOC includes a data channel with a read path and a write path. The read path includes two lines (not shown) (+R and −R) and the write path includes two lines (not shown) (+W and −W), and each signal pair are depicted as a single lines in FIG. 2 connected to the Data Channel block. The read and write paths form a transmission line between the SOC and each of the preamp. The transmission line is typically formed on a flex cable. In this example there are three preamp ICs connected to the common transmission line in a T configuration. Write data is sent from the SOC to all the preamp ICs simultaneously, even though only one preamp IC is active. Read data is sent to the SOC only from the active preamp IC.

The SOC also includes SOC logic circuitry connected to a common serial logic path on the flex cable. The SOC sends commands to preamp logic circuitry in each of the preamp ICs. The logic path includes a serial clock (SClk) line, a serial enable (SEN) line and a serial command or data (SData) line. The commands are used to set registers (not shown) in the preamp ICs with values for parameters that control the functions of the preamp ICs, including selection of one of the preamp ICs as the active preamp IC and identification of the read or write port as the active port for the selected preamp IC. Other supported logic lines not shown (write gate and fault) are also connected in a dotting configuration like the SClk line.

In embodiments of this invention each preamp IC includes a read resistor at the output of each read amplifier (Rs1, Rs2 and Rs3), and a write resistor at the input of each write driver (Rt2, Rt2 and Rt3). The resistors may have a fixed value and be located in the preamps (as shown in FIG. 2) or on the flex cable for the transmission line. If the resistors are located in the preamps then they are preferably programmable resistors that can be set to selected values at the time of disk drive manufacturing. The read resistors are at the source of the signal to the transmission line and the write resistors are at the termination of the signal from the transmission line. As will be explained in detail below and shown in accompanying figures, the read and write resistors provide impendence matching with the transmission line and the SOC when one of the preamp ICs is selected as active, which enables the SOC to operate seamlessly with a common transmission line connected to all preamp ICs.

Figure 3:
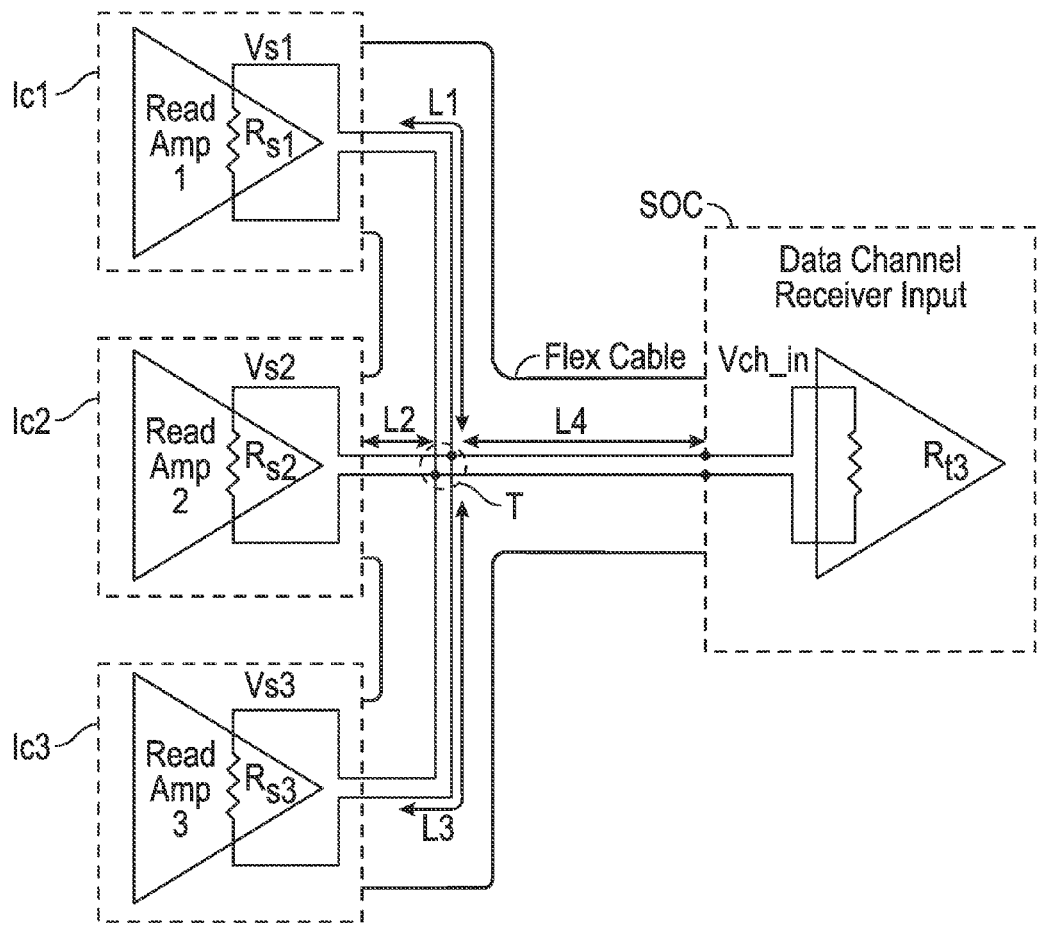
FIG. 3 is a schematic of the read path portion of an embodiment of the invention with three preamplifier ICs connected as a T connection at the termination of the transmission line from the SOC.

FIG. 3 is a schematic of the read path portion of an embodiment of the invention with three preamp ICs connected in a T configuration at the termination of the transmission line from the SOC. The transmission line has a length L4 from the SOC to the termination at a T connection. The length of the connection from each preamp IC to the T connection is L1, L2 and L3 for IC1, IC2 and IC3, respectively. The readback signal integrity is affected by the lengths L1, L2 and L3, which can vary depending on how each preamp IC is laid out for connection to the flex cable. The lengths L1, L2 and L3 should be as short as possible, but cannot always be due to the geometry of the HDD. When one of the preamp ICs, for example IC1, is active, it provides a source signal Vs1 that is received at the data channel input as Vch_in. The two inactive preamp ICs IC2 and IC3, in the absence of the programmable resistors Rs2 and Rs3, would provide a high impedance, typically several thousand ohms. It can be shown that if any one of L1, L2 or L3 is greater than $1/(4*Fbitrate*Vel)$, where Fbitrate is the data rate of transmission of the read data and Vel is the velocity of transmission (about 6 ps/mm), then the source resistance of the inactive read amplifiers is critical. If any of the lengths L2 or L3 is too long, then one or more of the source resistances of the inactive read amplifiers IC2 and IC3 needs to be matched to Rt, the transmission line impedance and the termination impedance for the data channel receiver input at the SOC. This is the reason for the programmable read resistors.

Figure 4A:
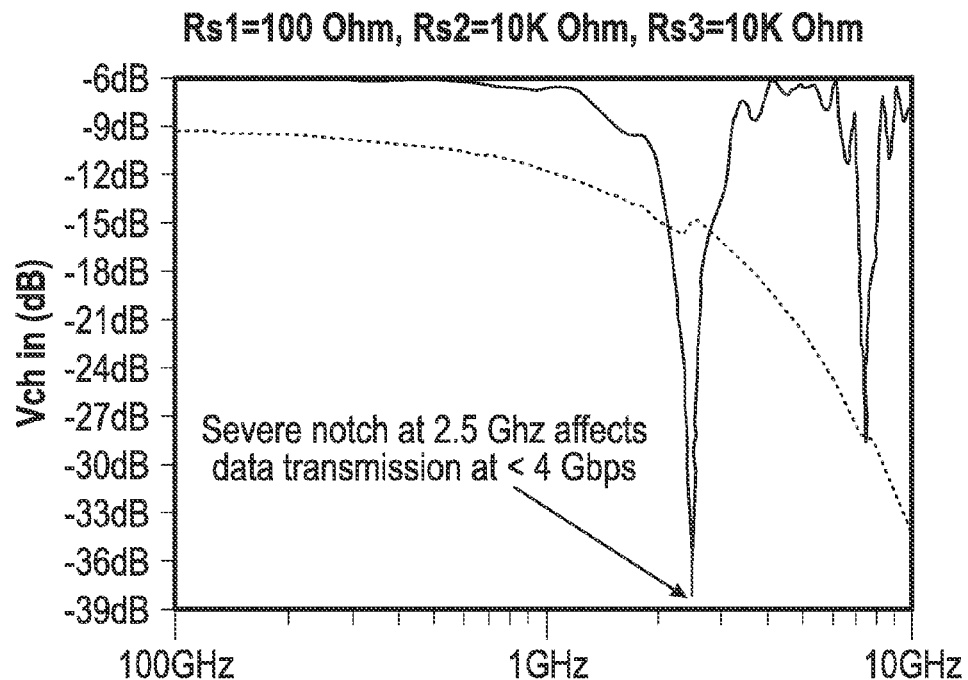
FIG. 4A is a graph of data channel receiver input gain (Vch_in) as a function of readback data rate for an example with three ICs, two of which have no programmable read resistor.
Figure 4B:
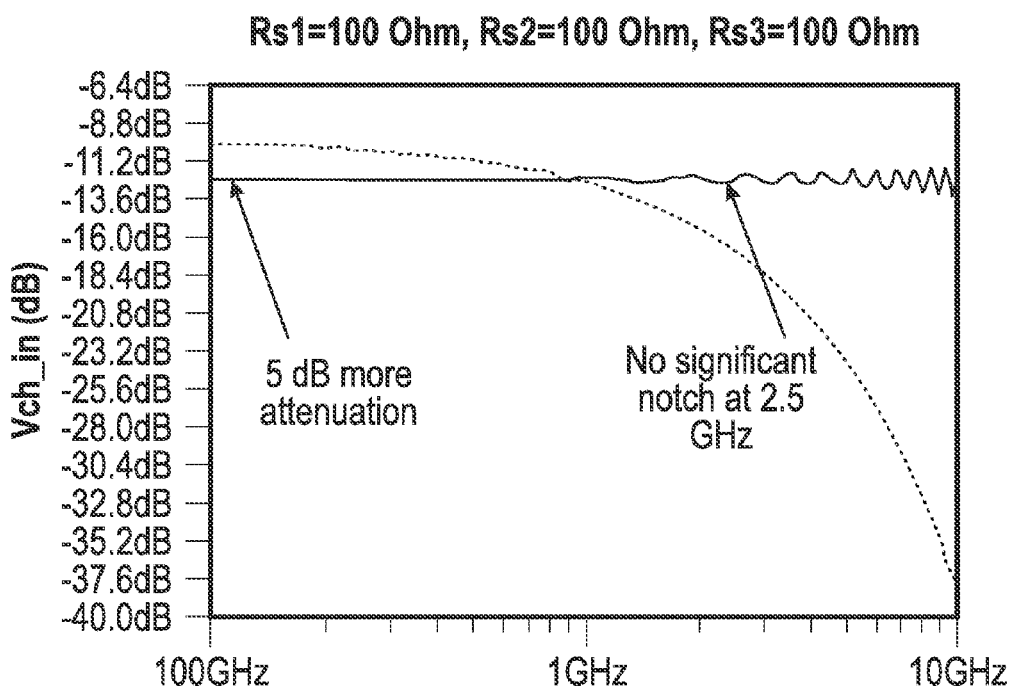
FIG. 4B is a graph of data channel receiver input gain (Vch_in) as a function of readback data rate for an example with three ICs, all of which have a programmable read resistor according to an embodiment of the invention.

The advantages of the invention can be illustrated by an example. Assume L1=L2=L3=16 mm, L4=100 mm and Rt3=100 Ohm. Further assume that IC1 is the source for the readback signal and has a source resistance of 100 Ohm, and inactive IC2 and IC3 each has a resistance of 10 k Ohm. Then FIG. 4A is a graph of data channel receiver input gain (Vch_in) as a function of readback data rate. A severe notch occurs at about 2.5 Gbps, which is unacceptable for a HDD with a high data rate, i.e., typically greater than about 4 Gbps. If however, IC2 and IC3 have programmable resistors Rs2 and Rs3, respectively, which have been programmed for 100 Ohm, then the graph of Vch_in as a function of readback data rate is as shown in FIG. 4B. There is no significant notch at any data rate; however, there is a 5 db increase in attenuation. This can be compensated by increasing the source read amplifier's gain, which is one of the parameters that can be set in the preamp IC registers via the serial logic path.

Figure 5:
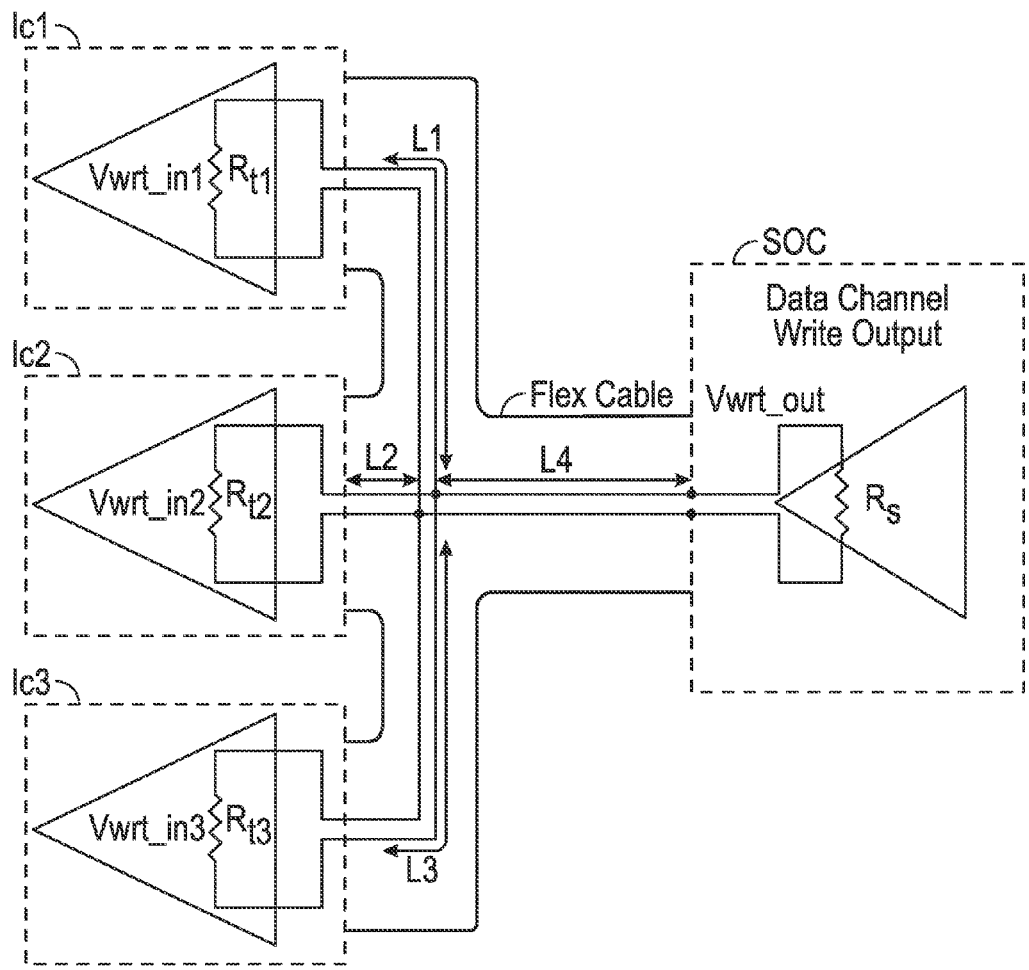
FIG. 5 is a schematic of the write path portion of an embodiment of the invention with three preamp ICs connected as a T connection at the termination of the transmission line from the SOC.

FIG. 5 is a schematic of the write path portion of an embodiment of the invention with three preamp ICs connected in a T configuration at the termination of the transmission line from the SOC. The transmission line has a length L4 from the SOC to the termination at a T connection. The length of the connection from each preamp IC to the T connection is L1, L2 and L3 for IC1, IC2 and IC3, respectively. The lengths L1, L2 and L3 should be as short as possible, but cannot always be due to the geometry of the HDD. The write data is sent from the data channel write circuitry, which has a source resistance Rs, to each of the ICs simultaneously, even though only one of the ICs is active. It can be shown that if any one of L1, L2 or L3 is greater than 1/(8*Fbitrate*Vel), where Fbitrate is the data rate of transmission of the write data and Vel is the velocity of transmission (about 6 ps/mm), then the termination resistance of the write driver input is critical and a write resistor is necessary to match the transmission line impedance and Rs, the source impedance for the write data circuitry in the SOC. This is the reason for the programmable write resistors Rt1, Rt2 and Rt3.

Figure 6A:
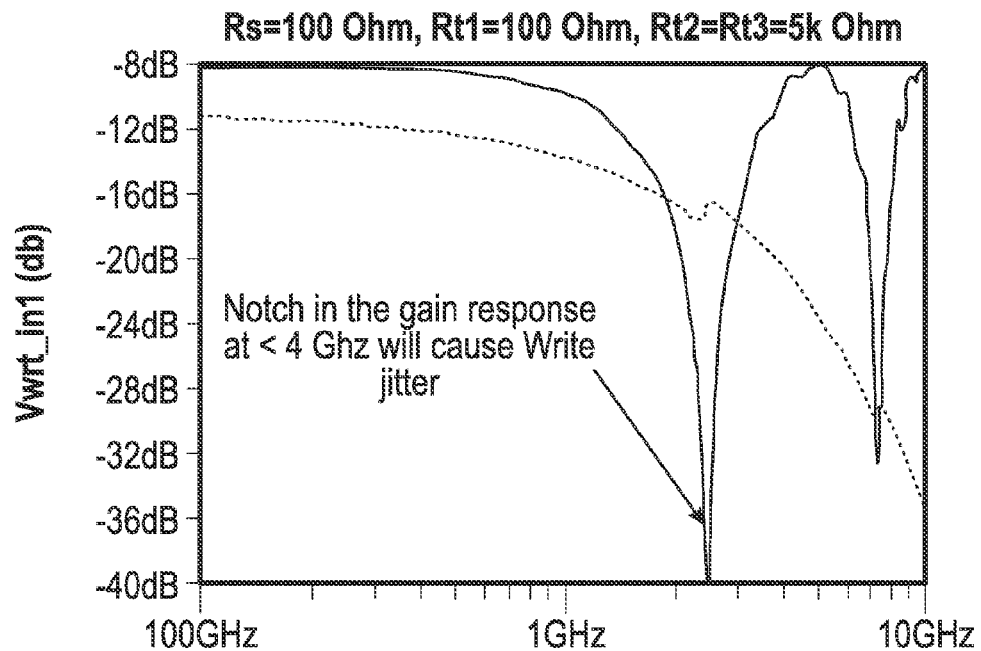
FIG. 6A is a graph of the active write input (Vwrt_in1) as a function of frequency for an example with three ICs, only one of which has a programmable write resistor.
Figure 6B:
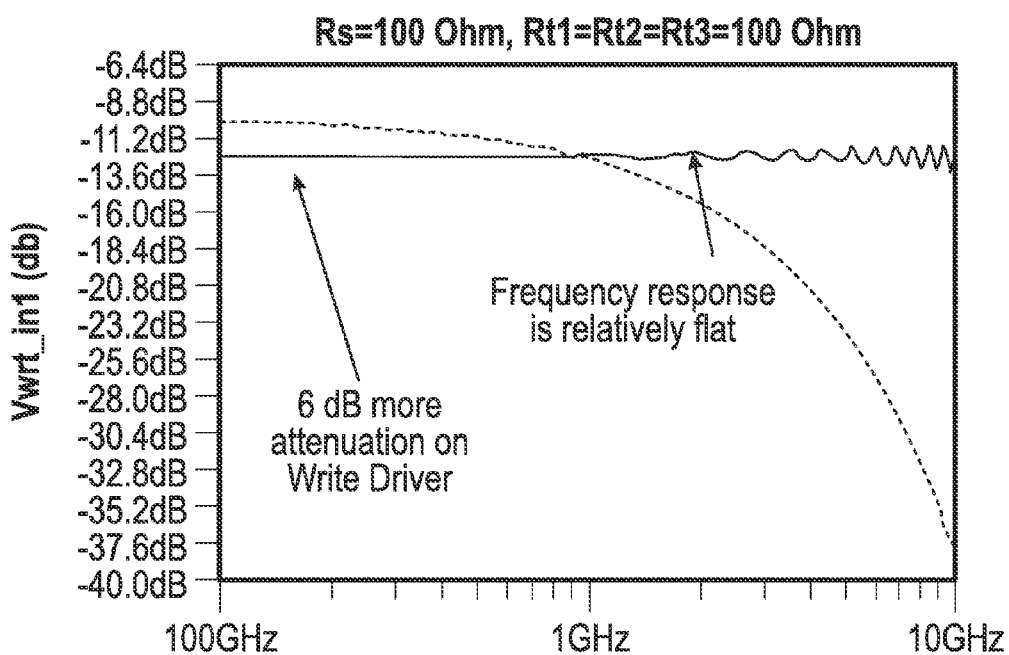
FIG. 6B is a graph of the active write input (Vwrt_in1) as a function of frequency for an example with three ICs, all of which have a programmable write resistor according to an embodiment of the invention.

The advantages of the invention can be illustrated by an example. Assume L1=L2=L3=16 mm, L4=100 mm, Rs=100 Ohm and IC1 is the preamp IC with the active write driver and Rt1=100. Further assume that IC2 and IC3 have no programmable write resistors and that the write driver termination resistance for IC2 and IC3 is 5 k Ohm. Then FIG. 6A is a graph of Vwrt_in1 as a function of frequency. A severe notch occurs at about 2.5 Gbps, which is unacceptable for a HDD with a high data rate, i.e., typically greater than about 4 Gbps, because it will cause write jitter. However, if IC2 and IC3 have programmable write resistors Rt2 and Rt3 also equal to 100 Ohm, then the graph of Vwrt_in1 as a function of frequency is as shown in FIG. 6B. There is no significant notch at any data rate; however, there is a 6 db increase in attenuation. This can be compensated by increasing Vwrt_in1, which is a parameter that can be set in the SOC registers.

Figure 7:
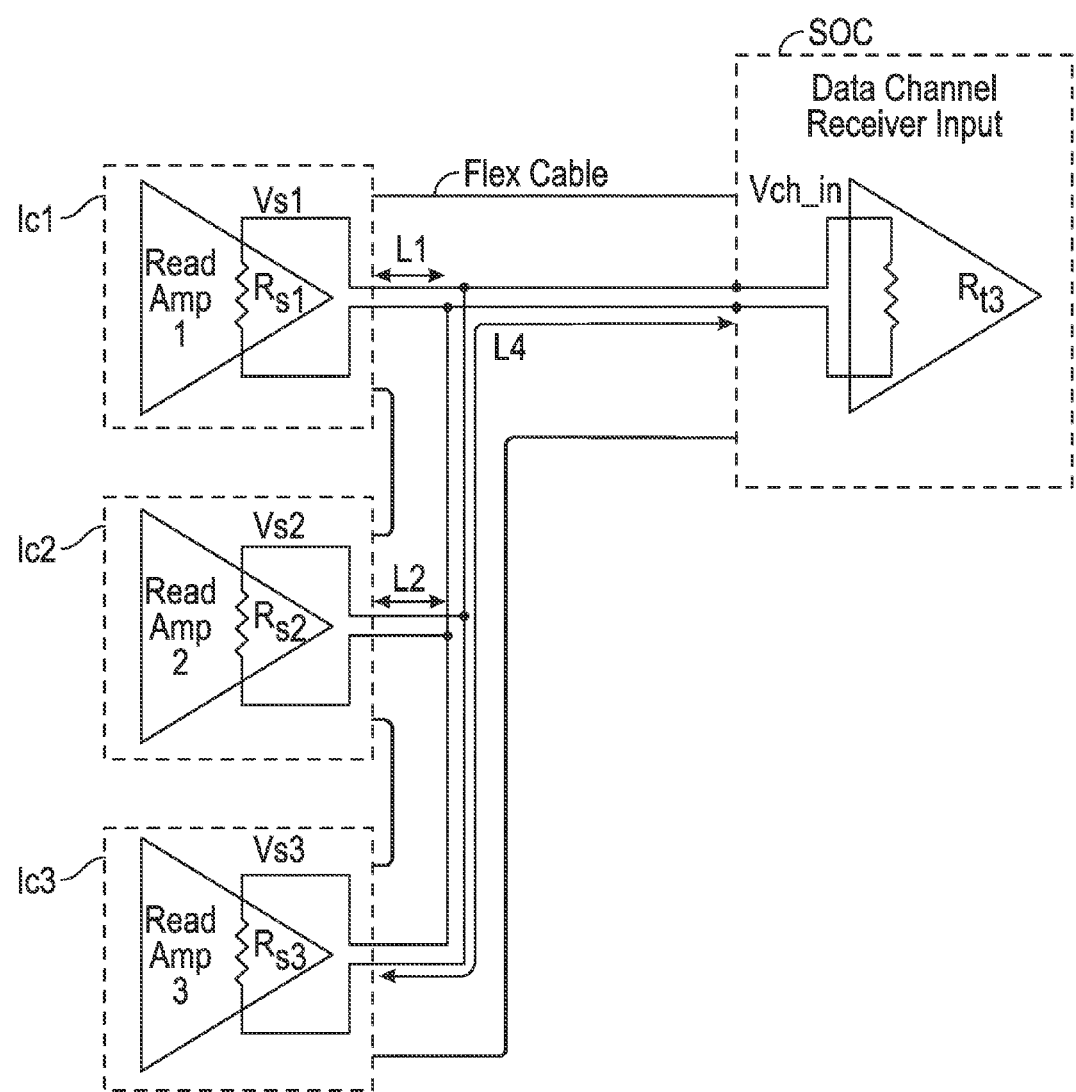
FIG. 7 is a schematic of the read path portion of an embodiment of the invention with three preamp ICs connected in an inline configuration to the transmission line according to an embodiment of the invention.
Figure 8:
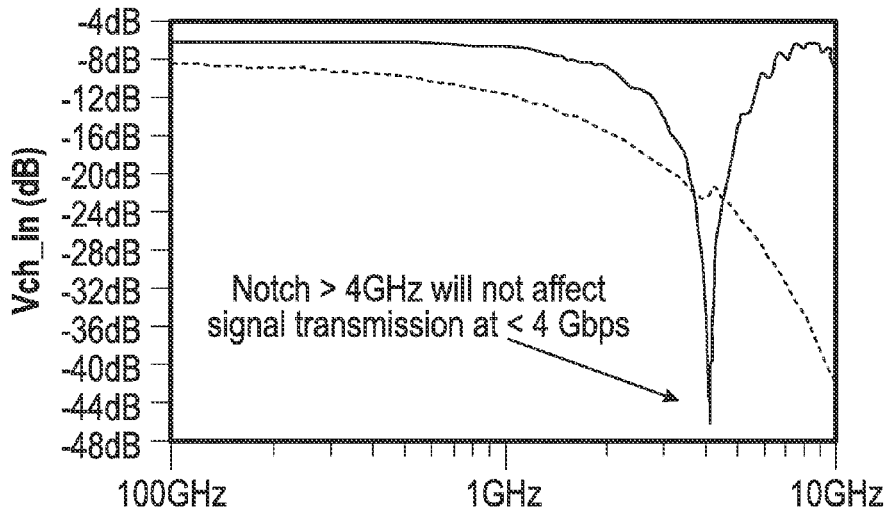
FIG. 8 is a graph of data channel receiver input gain (Vch_in) as a function of readback data rate for an example with three ICs in an inline configuration, where only the IC at the termination of the transmission line has a programmable read resistor according to an embodiment of the invention.

While the connection of the preamp ICs to the flex cable is preferably a T configuration, as shown in FIGS. 3 and 5, other connection configurations are possible. FIG. 7 is a schematic of the read path portion of an embodiment of the invention with three preamp ICs connected in an inline configuration to the transmission line. In this example the transmission line terminates at IC3, and IC1 and IC2 are connected to the transmission line between the termination and the SOC. In this example if L1 and L2 are small, i.e., less than 1/(4*Fbitrate*Vel), for example less than 10 mm, then a read resistor is required only for IC3. If IC3 is the active preamp IC, Rs3=100 Ohm and Rs1=Rs2=10 k Ohm, and Rt3=100 Ohm, then the graph of Vch_in as a function of readback data rate is shown in FIG. 8. There is a notch, but at a data rate greater than 4 Gbps. Thus, depending on the lengths L1 and L2, a read resistor may also be required for IC2 and IC3. Similarly, for an inline configuration, IC3 would also include a write resistor.

Figure 9:
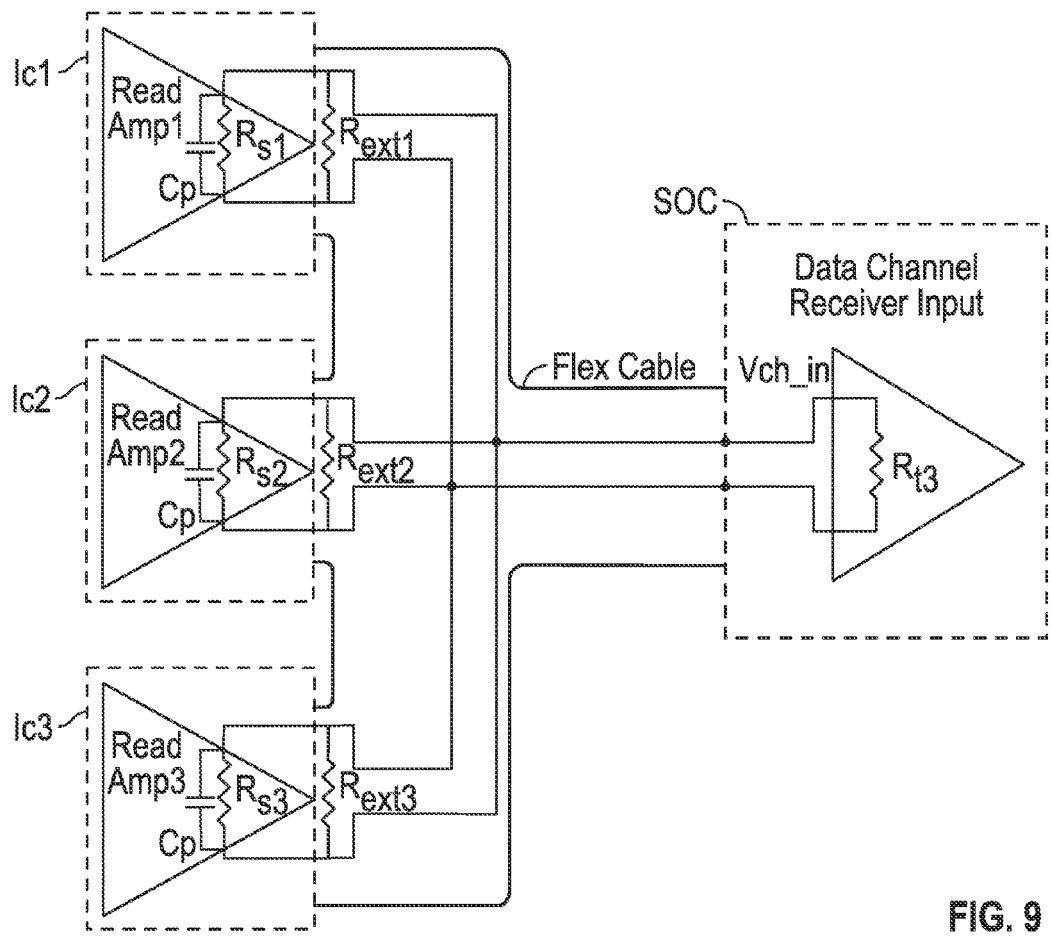
FIG. 9 is a schematic of the read path with fixed external read resistors coupled in parallel with the source resistance of each read amplifier according to an embodiment of the invention.

While the preferred embodiments of the invention utilize programmable read resistors and write resistors located in each of the preamp ICs, it is possible to use fixed resistors external to the preamp ICs, for example on the flex cable. This is illustrated in FIG. 9 for the read path with fixed read resistors Rext1, Rext2 and Rext3 coupled in parallel with the source resistance of each read amplifier in IC1, IC2 and IC3, respectively. Cp is the parasitic capacitance of about 0.5 pF internal to each preamp IC. A similar embodiment would use fixed external write resistors on the flex cable and coupled to each of the write driver inputs in the preamp ICs.

Figure 10:
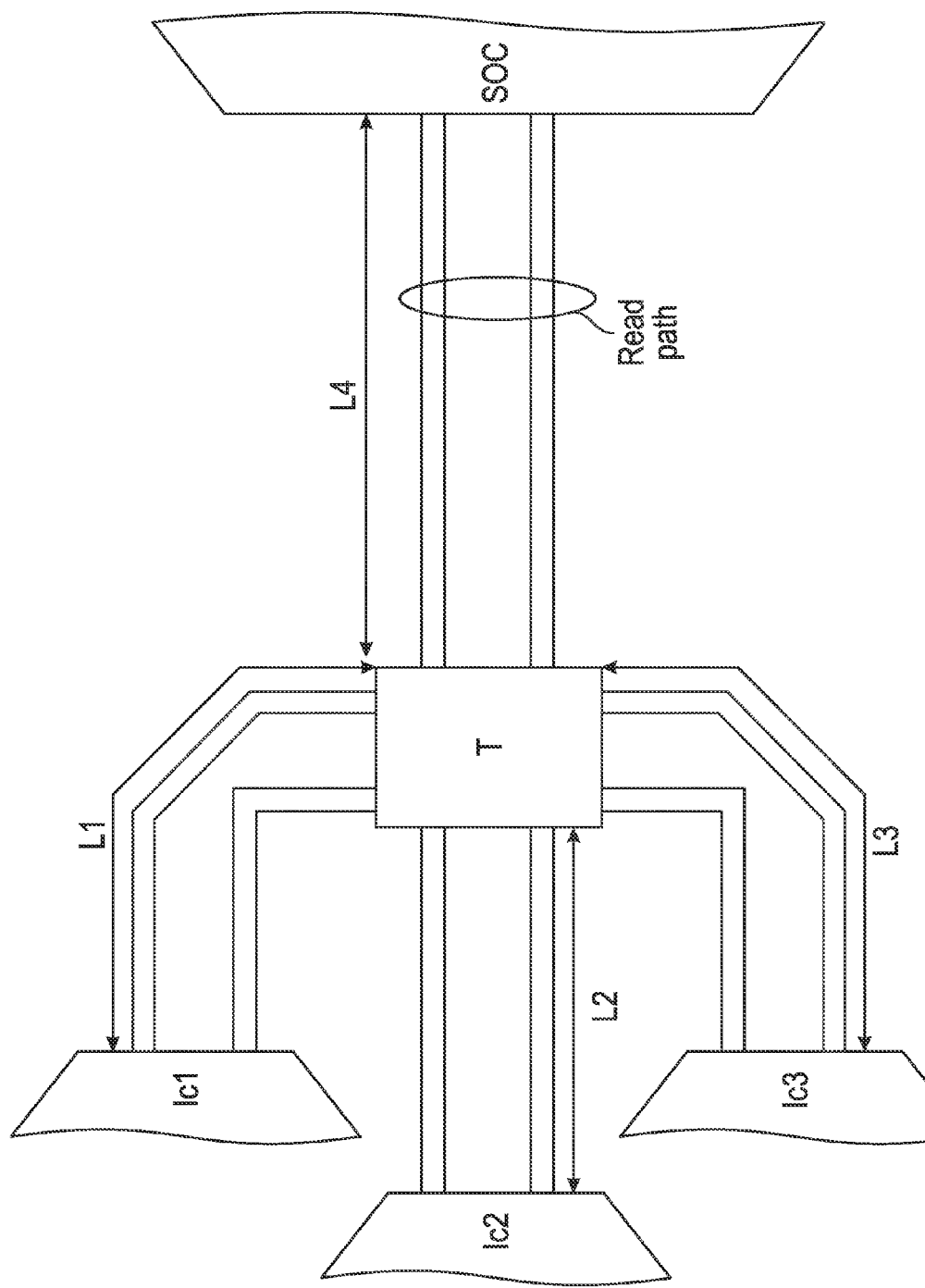
FIG. 10 is a schematic of the read path where the connection lines with lengths L1, L2 and L3 are substantially the same length but have a narrower width and a greater spacing than the main read path lines with a length L4 between the SOC and the T termination.
Figure 11:
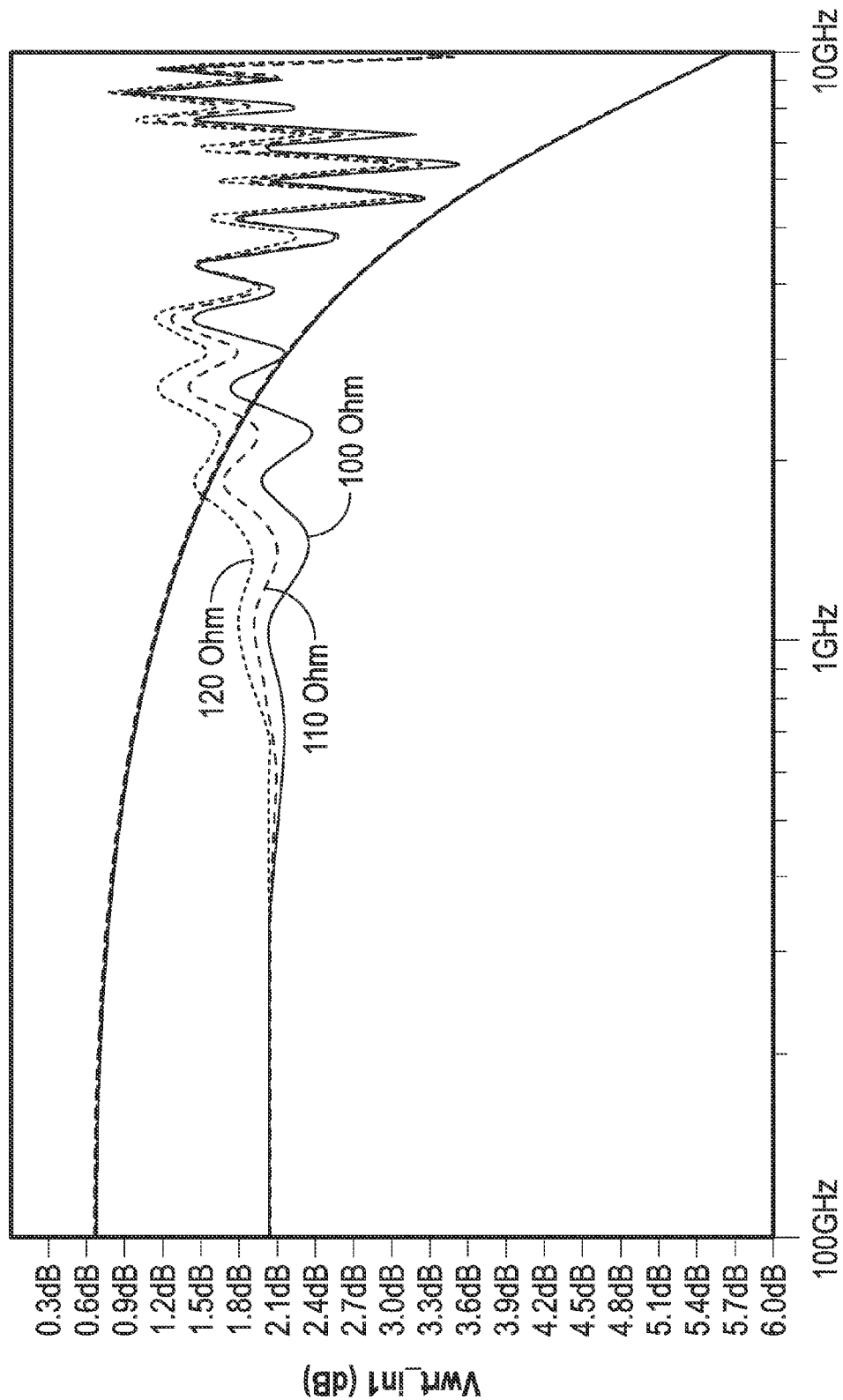
FIG. 11 is a graph of Vwrt_in1 as a function of frequency for an example where the length L4 has a characteristic impedance of 100 Ohm and the lengths L1, L2 and L3 have substantially the same (+/−10%) characteristic impedances increasing from 100 Ohm to 120 Ohm.

In the preferred embodiment using a T configuration at the termination of the transmission line, the lengths of the connections between the preamp ICs and the transmission line termination (L1, L2 and L3) are substantially equal, i.e., within +/−10%. However, increasing the characteristic impedance of L1, L2 and L3 will add a high-frequency boost that will be beneficial to the system response. This can be accomplished by decreasing the width and/or increasing the pitch of the lines with lengths L1, L2 and L3. This is depicted in FIG. 10 for the read path where the connection lines with lengths L1, L2 and L3 are substantially the same length but have a narrower width and a greater spacing or pitch than the main read path lines with a length L4 between the SOC and the T termination. FIG. 11 is a graph of Vwrt_in1 as a function of frequency for an example where the length L4 has a characteristic impedance of 100 Ohm and the lengths L1, L2 and L3 have substantially the same (+/−10%) characteristic impedances increasing from 100 Ohm to 120 Ohm. FIG. 11 shows a 0.5 dB boost at 2 GHz for a 20% increase in the impedances of the connection lengths L1, L2 and L3, i.e., where they have substantially the same impedance of 100 Ohm.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A disk drive having a plurality of magnetic recording disks and a plurality of read/write heads, the disk drive comprising:
   a system on a chip (SOC) for sending write data and receiving read data and for sending logic commands;
   at least two preamplifier integrated circuits (preamps), each preamp having a write driver, a read amplifier, multiple read/write ports for connection to associated read/write heads, and logic circuitry;
   a transmission line connecting the SOC to each of the preamps, the transmission line including a write path, a read path and a serial logic path;
   wherein the SOC is configured to activate a selected one of the preamps with a logic command on the logic path and to transmit write data to all preamps simultaneously on the transmission line write path, and to activate a selected one of the preamps with a logic command on the logic path and to receive read data from said selected preamp on the transmission line read path;
   a read resistor between at least one preamp read amplifier and the SOC; and
   a write resistor between at least one preamp write driver and the SOC.

2. The disk drive of claim 1 wherein the read resistor is located in the preamp.

3. The disk drive of claim 2 wherein the read resistor is a programmable resistor.

4. The disk drive of claim 1 wherein the write resistor is located in the preamp.

5. The disk drive of claim 4 wherein the write resistor is a programmable resistor.

6. The disk drive of claim 1 further comprising a flex cable, wherein the transmission line is located on the flex cable, and wherein the read resistor is located on the flex cable.

7. The disk drive of claim 1 further comprising a flex cable, wherein the transmission line is located on the flex cable, and wherein the write resistor is located on the flex cable.

8. The disk drive of claim 1 wherein the transmission line terminates at one of the preamps and all other preamps are connected to the transmission line between said termination and the SOC, and wherein the preamp connected at the transmission line termination includes a read resistor and a write resistor.

9. The disk drive of claim 1 wherein the transmission line terminates at a termination end and all preamps are connected to the transmission line termination end.

10. The disk drive of claim 9 wherein the read resistor is a programmable resistor located in the preamp and wherein the length of the connection between the preamp and the termination end is greater than $1/(4*Fbitrate*Vel)$, where Fbitrate is the data rate of transmission of the read data and Vel is the velocity of transmission.

11. The disk drive of claim 1 wherein there are three preamps.

12. The disk drive of claim 11 wherein the transmission line terminates at a termination end, wherein all three preamps are connected by connection lines to the transmission line termination end in a T configuration, and wherein the lengths of the connection lines between each of the three preamps and the termination end are substantially equal.

13. The disk drive of claim 12 wherein the transmission line read path comprises a pair of read lines, wherein each connection line comprises a pair of read connection lines, and wherein the widths of the read connection lines are narrower than the widths of the read lines.

14. The disk drive of claim 12 wherein the transmission line read path comprises a pair of read lines, wherein each connection line comprises a pair of read connection lines, and wherein the spacing between the read connection lines in each connection line is greater than the spacing between the read lines.

15. A disk drive having a plurality of magnetic recording disks and a plurality of read/write heads, the disk drive comprising:
- a system on a chip (SOC) for sending write data and receiving read data and for sending logic commands;
- three preamplifier integrated circuits (preamps), each preamp having a write driver, a read amplifier, multiple read/write ports for connection to associated read/write heads, and logic circuitry, wherein at least one preamp further comprises a programmable read resistor connected to the output of the read amplifier and a programmable write resistor connected to the input of the write driver;
- a transmission line connecting the SOC to each of the preamps, the transmission line including a write path, a read path and a serial logic path, wherein the write path is connected to said at least one write resistor and the read path is connected to said at least one read resistor; and
- wherein the SOC is configured to activate a selected one of the preamps with a logic command on the logic path and to transmit write data to all preamps simultaneously on the transmission line write path, and to activate a selected one of the preamps with a logic command on the logic path and to receive read data from said selected preamp on the transmission line read path.

16. The disk drive of claim 15 further comprising a flex cable, wherein the transmission line is located on the flex cable.

17. The disk drive of claim 15 wherein the transmission line terminates at one of the preamps and all other preamps are connected to the transmission line between said termination and the SOC, and wherein the preamp connected at the transmission line termination includes a read resistor and a write resistor.

18. The disk drive of claim 15 wherein the transmission line terminates at a termination end and all preamps are connected by connection lines to the transmission line termination end in a T configuration, and wherein all preamps include a read resistor and a write resistor.

19. The disk drive of claim 18 wherein the lengths of the connection lines between each of the three preamps and the termination end are substantially equal, wherein the characteristic impedances of the connection lines are substantially equal and greater than the characteristic impedance of the transmission lines from the SOC to the termination end.

* * * * *

UNITED STATES PATENT AND TRADEMARK OFFICE
CERTIFICATE OF CORRECTION

PATENT NO. : 9,165,596 B1  
APPLICATION NO. : 14/656898  
DATED : October 20, 2015  
INVENTOR(S) : John Contreras et al.

It is certified that error appears in the above-identified patent and that said Letters Patent is hereby corrected as shown below:

On the title page, next to item "(72) Inventors:", add --Kazuhiro Nagaoka, Fujisawa (JP)--.

Signed and Sealed this  
Twelfth Day of July, 2016

Michelle K. Lee  
*Director of the United States Patent and Trademark Office*